(12) United States Patent
Quan et al.

(10) Patent No.: US 9,184,810 B2
(45) Date of Patent: Nov. 10, 2015

(54) SCHEDULING ALGORITHMS FOR MULTI-USER (MU) MULTIPLE-INPUT MULTIPLE-OUTPUT (MIMO) COMMUNICATION SYSTEMS

(75) Inventors: Zhi Quan, San Diego, CA (US); Simone Merlin, San Diego, CA (US); Santosh Paul Abraham, San Diego, CA (US); Sameer Vermani, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 13/465,522

(22) Filed: May 7, 2012

(65) Prior Publication Data

US 2013/0272211 A1 Oct. 17, 2013

Related U.S. Application Data

(60) Provisional application No. 61/623,835, filed on Apr. 13, 2012.

(51) Int. Cl.
*H04W 4/00* (2009.01)
*H04B 7/04* (2006.01)
*H04W 72/12* (2009.01)

(52) U.S. Cl.
CPC ......... *H04B 7/0452* (2013.01); *H04W 72/1221* (2013.01); *H04W 72/12* (2013.01)

(58) Field of Classification Search
None
See application file for complete search history.

(56) References Cited

U.S. PATENT DOCUMENTS

| 7,778,342 B2 | 8/2010 | Larsson et al. | |
|---|---|---|---|
| 2008/0101244 A1* | 5/2008 | Liu et al. | 370/238 |
| 2008/0316981 A1* | 12/2008 | Trainin | 370/338 |
| 2009/0046593 A1* | 2/2009 | Ptasinski et al. | 370/252 |
| 2009/0122717 A1* | 5/2009 | Das et al. | 370/253 |

(Continued)

FOREIGN PATENT DOCUMENTS

| WO | 2011083905 A2 | 7/2011 |
|---|---|---|
| WO | 2012030852 A1 | 3/2012 |

OTHER PUBLICATIONS

Mirkovic et al., (Wireless Comm. Networking and Mobile computing, 2007).*

(Continued)

*Primary Examiner* — Kwang B Yao
*Assistant Examiner* — Hardikkumar Patel
(74) *Attorney, Agent, or Firm* — Eric Ho (57) ABSTRACT

A method is provided for wirelessly transmitting from a transmitter to one or more receivers within a multi-user (MU) multiple-input and multiple-output (MIMO) communication system. A number of concurrent (spatial) streams are dynamically allocated in a MU-MIMO transmission to each of a plurality of served receivers to maximize total data transmitted on each transmission. Streams are allocated according to a corresponding transmission queue length for each receiver and the number of receive antennas used by each of the served receivers. A transmission timer is started upon sending the transmission. A random backoff counter is also started upon one of either: (a) expiration of the transmission timer or (b) receipt of data at a transmission queue. A new transmission is sent upon expiration of the random backoff counter if the transmission timer has expired. Otherwise, the random backoff counter is restarted one or more times until the transmission timer has expired.

32 Claims, 8 Drawing Sheets

(56) References Cited

U.S. PATENT DOCUMENTS

| | | | |
|---|---|---|---|
| 2009/0290655 A1* | 11/2009 | Abraham et al. | 375/267 |
| 2010/0278225 A1 | 11/2010 | Chun et al. | |
| 2011/0080877 A1* | 4/2011 | Nentwig | 370/329 |
| 2012/0008490 A1* | 1/2012 | Zhu | 370/216 |
| 2012/0115541 A1* | 5/2012 | Suga | 455/525 |
| 2012/0218947 A1 | 8/2012 | Merlin et al. | |
| 2013/0242735 A1* | 9/2013 | Koc et al. | 370/232 |

OTHER PUBLICATIONS

Bellalta, B., & Oliver, M., "A Space-time Batch Service Queueing Model for Multi-user MIMO Communication Systems", Proceedings of the 12th ACM International Conference on Modeling, Analysis and Simulation of Wireless and Mobile Systems, 2009, pp. 357-364.

Majkowski, et. al., "Dynamic TXOP Configuration for QoS Enhancement in IEEE 802.11e Wireless LAN", International Conference on Software in Telecommunications and Computer Networks Software in Telecommunications and Wireless Networks, doi: 10.1109/softcom.2006.329721, 2006, pp. 1-3.

Zhu, et al., "TXOP Enhancement for DL MU-MIMO Support", DOI: 802.11-10/0591r0, May 18, 2010, pp. 2, 7-11, 13.

International Search Report and Written Opinion—PCT/US2013/036249—ISA/EPO—Jun. 21, 2013.

Mirkovic J., et al., "Channel Aware Scheduling in MU-DCF WLANs",Wireless Communications, Networking and Mobile Computing, 2007. WICOM 2007.International Conference on, IEEE, Piscataway, NJ, USA, Sep. 21, 2007, pp. 1184-1187, XP031261477, ISBN: 978-1-4244-1311-9.

Zhu C., et al., "MAC enhancements for downlink multi-user MIMO transmission in next generation WLAN", Consumer Communications and Networking Conference (CCNC), 2012 IEEE, IEEE, Jan. 14, 2012, pp. 832-837, XP032161038, DOI: 10.1109/CCNC.2012.6181174, ISBN: 978-1-4577-2070-3.

\* cited by examiner

SCHEDULING ALGORITHMS FOR MULTI-USER (MU) MULTIPLE-INPUT MULTIPLE-OUTPUT (MIMO) COMMUNICATION SYSTEMS

CROSS REFERENCE TO RELATED APPLICATIONS

The present Application for Patent claims priority to U.S. Provisional Applications No. 61/623,835, filed Apr. 13, 2012, which is hereby expressly incorporated by reference.

FIELD

Various features relate to wireless communication devices and systems, and more particularly, to methods and apparatuses for improving the efficiency of MU-MIMO transmissions.

BACKGROUND

Multiple-input and multiple-output (MIMO) techniques have been an important area of focus for next-generation wireless communication systems because they can provide high capacity, extended coverage, increased diversity, and/or interference suppression. For applications such as wireless local area networks (LANs) and 4G cellular networks, MIMO systems are sometimes deployed in environments where a single access point (AP) or base station (BS) communicates with many users simultaneously, concurrently, and/or contemporaneously. As a result, multi-user MIMO has emerged as an important feature of next-generation wireless networks. This feature has the potential to combine the high capacity of MIMO processing with the benefits of space-division multiple access (SDMA).

In multi-user (MU) wireless communications, different users (e.g., receivers/stations) are to be served with various qualities of service (QoS) requirements. When multiple antennas are used at the user transmitter and/or receiver, they can provide multiple access gain by spatially separating the signals to different users. Therefore, the multiplexing and scheduling methods implemented by MIMO transmitters play a role in determining the communication system capacity in a multi-user MIMO environment because different users can be assigned various data transmission rates with respect to their instantaneous channel status information (CSI), buffer backlogs, transmit (Tx)/receive (Rx) antennas, and MIMO processing techniques. These scheduling methodologies are especially attractive for 4G cellular systems and wireless LANs as they provide high data rates in addition to supporting multiple classes of services with various QoS requirements.

However, there is a need for efficient scheduling and/or transmission methods to improve MIMO transmissions.

SUMMARY

A method for wirelessly transmitting from a transmitter to one or more receivers within a multi-user (MU) multiple-input and multiple-output (MIMO) communication system is provided. Stream allocation may be performed by the transmitter by dynamically allocating a number of concurrent streams in a MU-MIMO transmission to each of a plurality of served receivers to maximize total data transmitted on each MU-MIMO transmission, wherein streams are allocated according to a corresponding transmission queue length for each receiver and the number of receive antennas used by each of the served receivers.

The transmitter may further perform packet aggregation by starting a transmission timer upon sending the MU-MIMO transmission. Also, a random backoff counter is started upon one of either: (a) expiration of the transmission timer or (b) receipt of data at a transmission queue. A new MU-MIMO transmission may then be sent upon expiration of the random backoff counter if the transmission timer has expired. Otherwise, the random backoff counter is restarted one or more times until the transmission timer has expired.

The transmitter may further perform stream allocation by: (a) sorting served receivers with respect to queue length at the access point; (b) ascertaining the number of receive antennas available to each receiver; and/or (c) allocating a number of streams to each receiver according to its corresponding queue length and the number of receiving antennas used by each of the receivers.

The transmitter may further perform link adaptation by updating a modulation and coding scheme for the streams to be transmitted to a particular receiver, prior to obtaining a new channel realization measurement, based on an estimated channel realization.

The estimated channel realization may be obtained by (a) modeling channel status information for a first channel for aging loss; and/or (b) adding a zero-mean Gaussian noise w to the previously obtained estimated channel realization h for the first channel to obtain an updated channel realization that can be used in updating the modulation and coding scheme for a first stream carried by the first channel. The modulation and coding scheme may be further updated based on a post-processing signal to interference and noise ratio for the first channel between the transmitter and the particular receiver.

In an exemplary implementation, selecting a modulation and coding scheme for the streams to be transmitted to a particular receiver may include: (a) calculating a link budget signal-to-noise ratio (SNR) between the transmitter and a first receiver using a corresponding transmit power, path loss, and/or thermal noise floor; (b) estimating a channel realization from channel status information feedback from the first receiver; (c) computing a precoding matrix for multi-user (MU) multiple-input multiple-output (MIMO) transmission using the estimated channel realization; (d) adding a zero-mean Gaussian noise to the estimated channel realization to obtain an updated channel realization with error; (e) calculating a post-processing signal to interference plus noise ratio (SINR) using the precoding matrix and the updated channel realization with error; and/or (f) deciding on a modulation and coding scheme for the streams transmitted to the first receiver based on the post-processing signal to interference and noise ratio (SINR).

In some implementations, updating a modulation and coding scheme for the streams may be updated on a per receiver basis. Streams to different receivers may have different modulation and coding schemes.

In one implementation, the random backoff counter may be defined by an IEEE 802.11 Multi-User MIMO wireless communication standard. The random backoff counter may be in the order of microseconds while the transmission interval is in the order of milliseconds.

In one implementation, each MU-MIMO transmission may include a MU-MIMO frame containing a plurality of streams to different stations, wherein the MU-MIMO frame has an expanded duration/length relative to typical frames defined for MU-MIMO transmissions.

DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Overview

Improved MAC scheduling algorithms are herein provided for a transmitter to schedule traffic flows destined to a number of receivers in a downlink MU-MIMO communication system. The transmitter may include a scheduler configured to perform stream allocation dynamic link adaptation, and/or packet aggregation. The scheduler may facilitate optimal resource allocation by assigning spatial streams to receivers with respect to their path losses, instantaneous backlogs, number of receive antennas, and MIMO processing techniques.

Exemplary Multiple-User Multiple-Input Multiple-Output Environment

Figure 1:
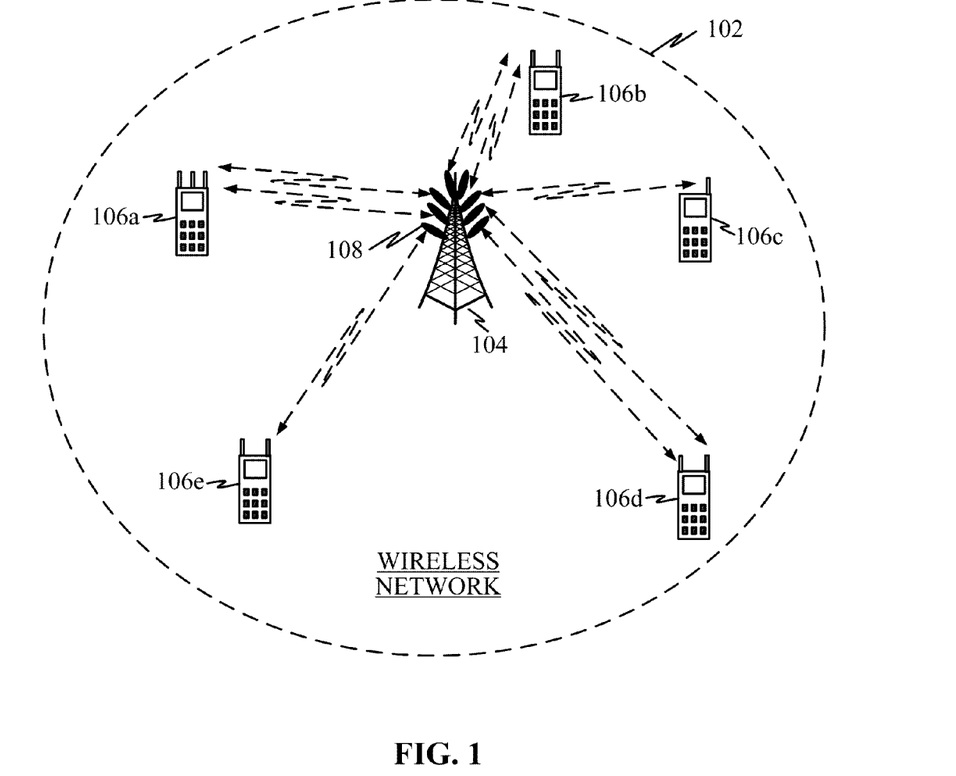
FIG. 1 illustrates an exemplary wireless network in which an access point (AP) may include multiple antennas through which it communicates with multiple stations (STAB).

FIG. 1 illustrates an exemplary wireless network 102 in which an access point (AP) 104 may include multiple antennas 108 through which it communicates with multiple stations (STAs) 106a-e. Here, the AP 104 may communicate with multiple users (MU) in a multiple-input multiple-output (MIMO) transmission using a plurality of concurrent, cotemporaneous, and/or simultaneous streams. In downlink MU-MIMO transmissions (i.e., from the AP to one or more stations), the AP 104 may achieve multiplexing gain by communicating with multiple stations 106a-e simultaneously. Thus, a scheduler for the AP 104 may assign a number of spatial streams to the STAs 106a-e for each downlink SDMA transmission.

The total number of streams (S) that AP 104 can send to the STAs 106a-e is limited by the number of transmit (Tx) antennas 108 at the AP 104. For example, the AP 104 can transmit at most eight spatial streams to the STAs 106a-e if the AP 104 has eight antennas 108. In practice, the number of streams the AP 104 uses to transmit to the STAs 106a-e may be determined by several factors, such as the path loss, traffic backlogs, and/or QoS requirements.

On the other hand, the number of streams that an STA 106a-e can receive from AP 104 may be limited by the number of receive (Rx) antennas at the STA 106a-e and its MIMO processing technique(s). For example, a two-antenna STA 106e can receive at most two streams from the AP 104. If the path loss between AP 104 and the STA 106e is large and the STA 106e decides to use some antennas to improve its post-processing signal-to-interference noise ratio (SINR), e.g., the interference cancellation or multi-user detection (MUD) technique(s), then the STA 106b may receive fewer streams than its receive antennas.

Figure 2:
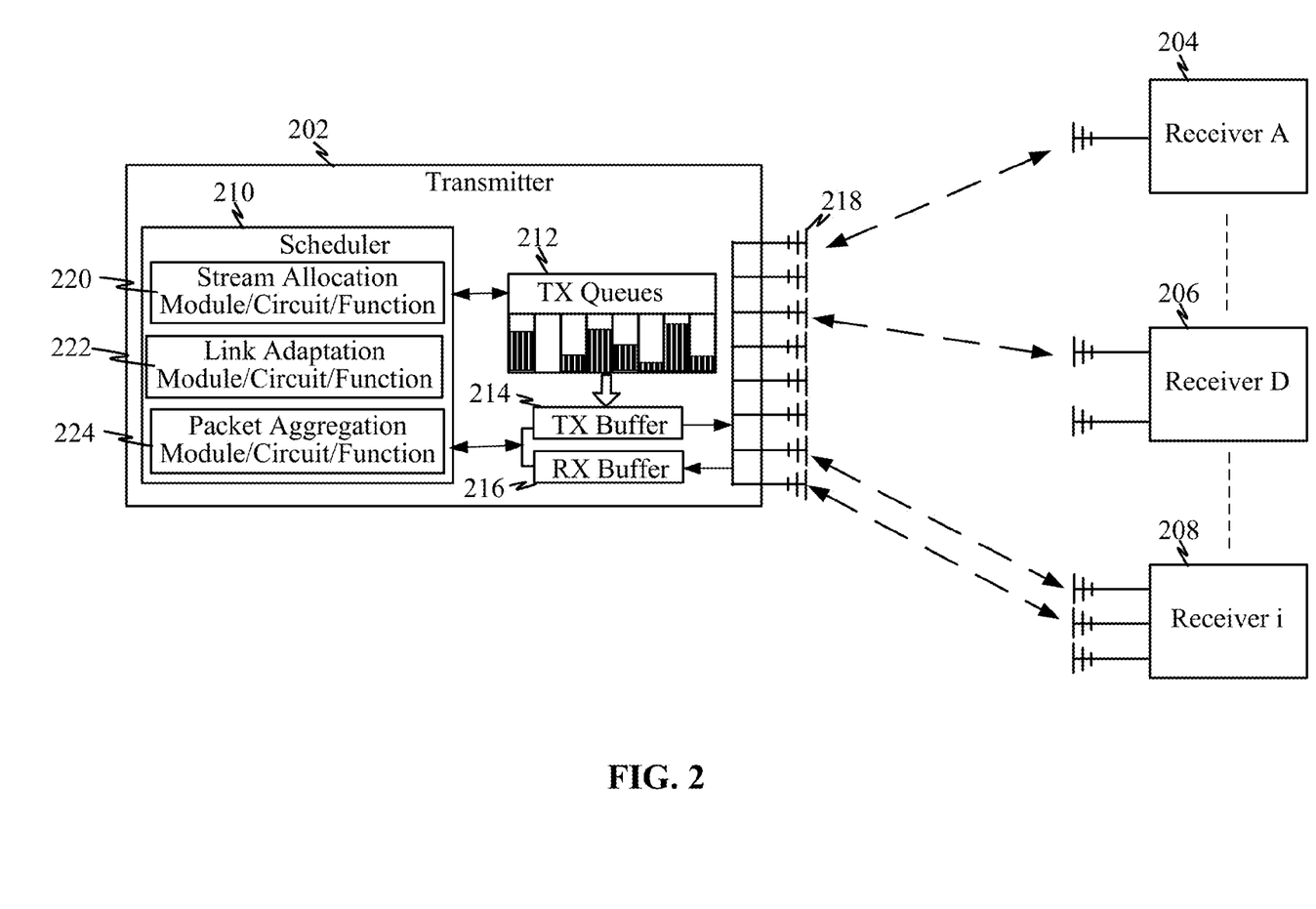
FIG. 2 is a block diagram illustrating a MU-MIMO communication system adapted for improved MAC layer MU-MIMO transmissions.

FIG. 2 is a block diagram illustrating a MU-MIMO communication system adapted for improved MAC layer MU-MIMO transmissions. The MU-MIMO communication system may include a transmitter 202 and a plurality of receivers 204, 206, and 208. In this example, the transmitter 202 may include a scheduler 210, one or more transmit (tx) queues 212 and a transmit/receive buffer 214/216 coupled to a plurality of antennas 218. Each of the transmit queues 212 may hold data/packets for transmission to a particular receiver 204, 206, 208. The data/packets in these transmit queues 212 may be combined into the transmit buffer 214 for transmission over separate streams.

The scheduler 210 may operate on the MAC layer of a protocol stack to allocate radio resources to the receivers (e.g., stations) with respect to the traffic profile and channel characteristics. An efficient method may be implemented by the scheduler 210 for the transmitter (e.g., at an access point) to schedule transmissions to the associated receivers 204, 206, and 208 and/or adjust the transmission rates with respect to their instantaneous CSI, buffer backlogs, antennas, and/or MIMO processing techniques. Such a method is capable of achieving substantial improvement in transmission throughputs and spectral efficiency while satisfying the various QoS requirements of different receivers. For this purpose, the scheduler 210 may include a stream allocation module/circuit/function 220, a link adaptation module/circuit/function 222, and/or a packet aggregation module/circuit/function 224.

The stream allocation module/circuit/function 220 may dynamically allocate a number of concurrent/co-temporal streams in a MU-MIMO transmission to each of a plurality of served stations to maximize total data transmitted for any one transmission. For instance, streams are allocated according to a corresponding transmission queue length for each station and the number of receive antennas used by each of the served stations. Note that such stream/antenna allocation may be limited by the number of transmit antennas 218 at the transmitter 202 and the number of receive antennas at each receiver 104, 206, and 208. Additionally, such stream/antenna allocation may be based on the amount of data/packets ready to be sent to each receiver 204, 206, and 208 and/or the link quality of the channel to each receiver 204, 206, and/or 208. Thus, a receiver with, for example, three receive antennas may not necessarily be assigned a greater number of streams than a receiver with, for example, two receive antennas. The number of streams and transmit antennas allocated to the receivers are selected for maximum utilization of transmit channels (and/or streams) available. Such allocation may occur dynamically so that stream and transmit antenna allocations may be adjusted periodically and/or every transmission period, for example.

For real-time traffic sensitive to latency, the stream allocation module/circuit/function 220 may limit the delay that the packets wait in the queue. The stream allocation module/circuit/function 220 may assign the streams to the receivers 204, 206, 208 with respect to the number of packets (or backlogs) in their queues. The number of streams assigned to the receivers may be proportional to its backlog in the transmit queues.

The packet aggregation module/circuit/function 224 may serve to reduce the percentage of airtime associated with a frame's fixed header by increasing the airtime percentage used for data/packet transmissions. The fixed overhead accounts for a larger percentage of airtime as the transmission time of data payload becomes shorter with respect to the increasing PHY layer transmission rate.

According to the IEEE 802.11 Enhanced Distributed Channel Access (EDCA) protocol, packets in a transmission buffer are transmitted after a random backoff interval. This standard-defined backoff interval may be random so as to avoid collisions in consecutive transmissions. This random backoff interval may be relatively short or long, but this may lead to inefficient transmissions (where the fixed-length header takes up a large percentage of airtime). Consequently, according to one feature, a transmission timer is added to make sure that the time interval between consecutive transmissions is not too short. This allows more data/packets to accumulate in a transmitter queue, making the transmission frame longer.

According to one example, a transmission timer is started upon sending the MU-MIMO transmission (e.g., a transmission frame). The random backoff counter may be started upon one of either: (a) the expiration of the transmission timer, or (b) receipt of data at a transmission queue. Then new MU-MIMO transmission (frame) may be sent upon the expiration of the random backoff counter if the transmission timer has also expired. Otherwise, the random backoff counter is restarted one or more times until the transmission timer has expired.

The link adaptation module/circuit/function 222 may serve to adjust the modulation and coding scheme(s) for each transmission channel. A modulation and coding scheme for the streams to be transmitted to a particular station are adjusted or updated, prior to obtaining a new channel realization measurement, based on estimates of channel realization (e.g., channel characteristic, such as interference and/or noise floor, at a particular moment). That is, the transmitter may have done a channel measurement on a first channel to obtain an initial or instantaneous channel realization. A first modulation and coding scheme may have been selected for the first channel based on such initial/instantaneous channel realization. However, since the channel characteristics may have changed with time, the first modulation and coding scheme selected may no longer be appropriate. The time interval between obtaining instantaneous channel realizations may be too long or too resource intensive to do very frequently. Consequently, the transmitter may generate an estimate of the channel realization (i.e., estimated channel realization) without taking a new channel measurement. This may be done by modeling the channel status information for aging loss, adding a zero-mean Gaussian noise w to the previously obtained channel realization h to obtain the estimated channel realization that can be used in selecting a MCS. Note that the added Gaussian noise w may also depend on the age of the previous channel realization measurement.

Exemplary Transmission Method

Figure 3:
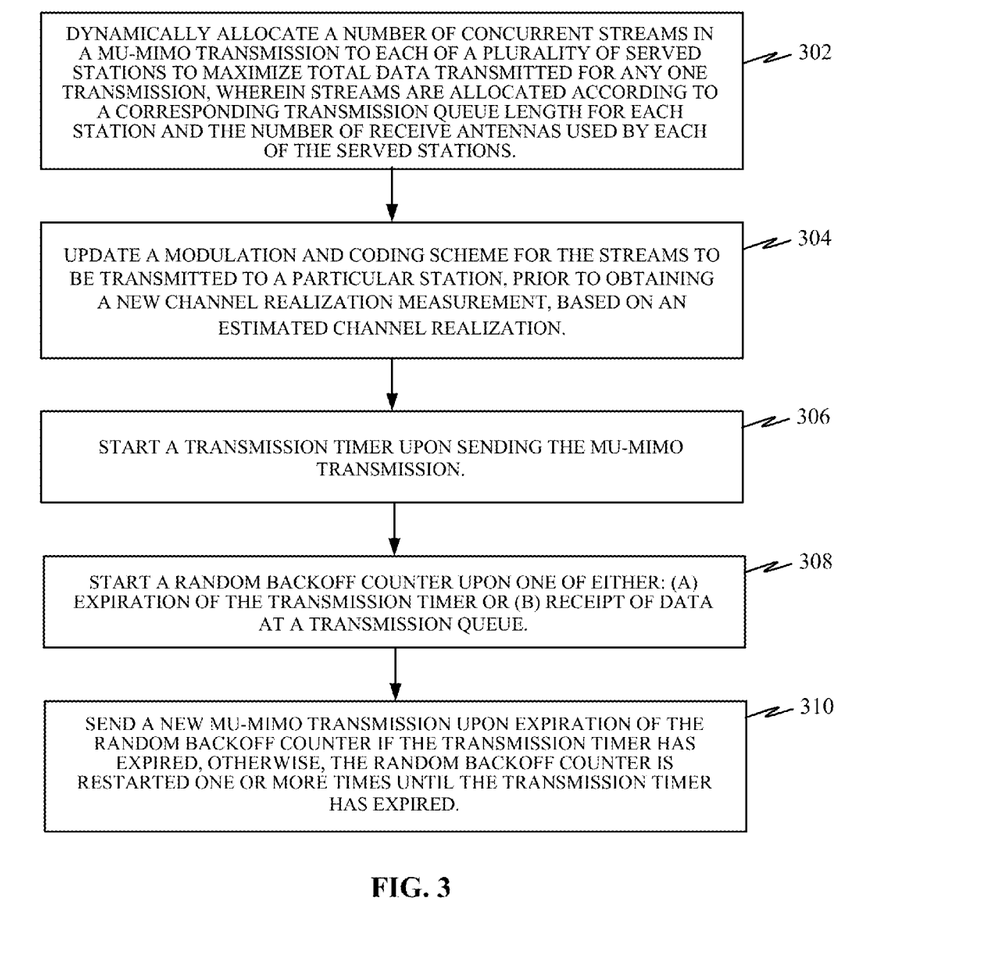
FIG. 3 illustrates a method to improve efficiency of MAC layer MU-MIMO transmissions.

FIG. 3 illustrates a method to improve efficiency of MAC layer MU-MIMO transmissions. This method may be implemented by a transmitter device, such as an access point to transmit to a plurality of receivers contemporaneously or concurrently.

Spatial Stream Allocation

According to a first feature, a method is provided for the AP to assign the spatial streams to STAs. For traffic flows in the same access category, the streams are allocated with respect to the backlogs, path loss, the number of receive antennas and/or the MIMO processing technique. For example, the AP may dynamically allocate/assign a number of concurrent streams in a MU-MIMO transmission (e.g., frame) to each of a plurality of served stations (receivers) to maximize total data transmitted for any one transmission, wherein streams are allocated according to a corresponding transmission queue length for each station and the number of receive antennas used by each of the served stations 302.

Link Adaptation

According to a second feature, a method is provided for downlink (DL) MU-MIMO to select a MCS for each spatial stream. The modulation and coding scheme selection used for a particular channel/stream may be determined jointly by a post-processing SINR, the CSI aging error, and an interference cancellation technique. For example, a modulation and coding scheme for the streams to be transmitted to a particular station is updated, prior to obtaining a new channel realization measurement, based on an estimated channel realization 304. For instance, the channel status information may be modeled for aging loss, and a zero-mean Gaussian noise w may be added to the previously obtained channel realization h to obtain the estimated channel realization that can be used in selecting a MCS. Note that the added Gaussian noise w may also depend on the age of the previous channel realization measurement.

Aggregation Enforcement

According to a third feature, a method is provided to ensure that a large number of packets are encapsulated into an aggregate. This may be done by starting a transmission timer upon sending the MU-MIMO transmission 306 and starting a random backoff counter (interval) upon one of either: (a) expiration of the transmission timer or (b) receipt of data at a transmission queue 308. A new MU-MIMO transmission is sent upon expiration of the random backoff counter if the transmission timer has expired, otherwise, the random backoff counter is restarted one or more times until the transmission timer has expired 310. The random backoff counter may be in the order of microseconds while the transmission interval may be in the order of milliseconds. In alternative implementations, the backoff counter (interval) may not be random but is instead a fixed interval or an interval within a range. Enforcing aggregation in this manner further improves the MAC efficiency, which reduces the fixed overhead, increases the MAC throughput, and provides QoS guarantees.

Exemplary Spatial Stream Allocation

Figure 4:
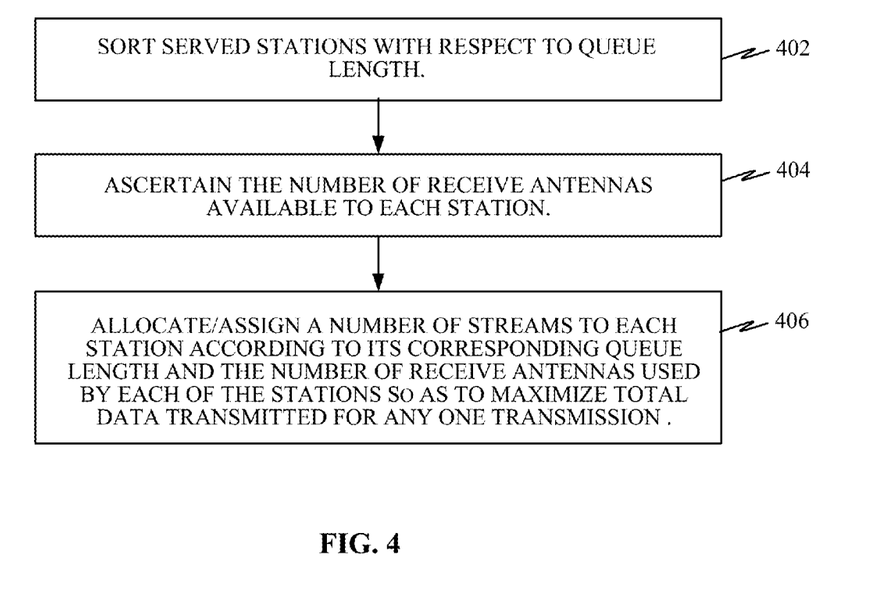
FIG. 4 illustrates a method for allocating streams at an access point or transmitter.

FIG. 4 illustrates a method for allocating streams at an access point or transmitter. The stations (receivers) may be sorted with respect to their transmit queue lengths (i.e., base station queue lengths) in a decreasing order 402. Let $L_i$ denote the queue length associated with station i in the sorted list. That is, $L_1 \geq L_2 \geq \ldots \geq L_N$.

The number of receive antennas available to each station are then ascertained 304.

A number of streams are then dynamically assigned/allocated to each station according to queue length and the number of receive antennas used by the station so as to maximize total data transmitted for any one transmission 406.

Let $S_i$ denote the number of streams assigned to station i. The stream allocation is given by $$S_i = \left\lceil \frac{SL_i}{\sum_{i=1}^{N} L_i} \right\rceil$$

Also, the assigned number of streams $S_i$ for a particular station i should not exceed the maximum number of streams that the station i can receive. As mentioned above, the maximum number of streams that a station can receive is determined by its number of antennas and MIMO processing technique (with or without MUD). The scheduler allocates the streams in the order the stations stand (from the sorting/ranking in step 302) until there is no stream available. Thus, $\Sigma S_i \leq S$.

Note that such stream allocation/assignment may be dynamic, being reallocated/reassigned periodically or on every transmission so that maximum use of airtime is made for data/packet transmissions (e.g., maximize total data transmitted for any one MU-MIMO transmission period).

Exemplary Link Adaption

Once the streams are assigned to the group of selected stations (receivers), the AP scheduler may select a transmission rate and/or modulation and coding scheme (MCS) for each stream. The MCS selection is determined by the post-processing signal to interference plus noise ratio (SINR), channel estimation error, and the MIMO processing technique at the receiver.

Figure 5:
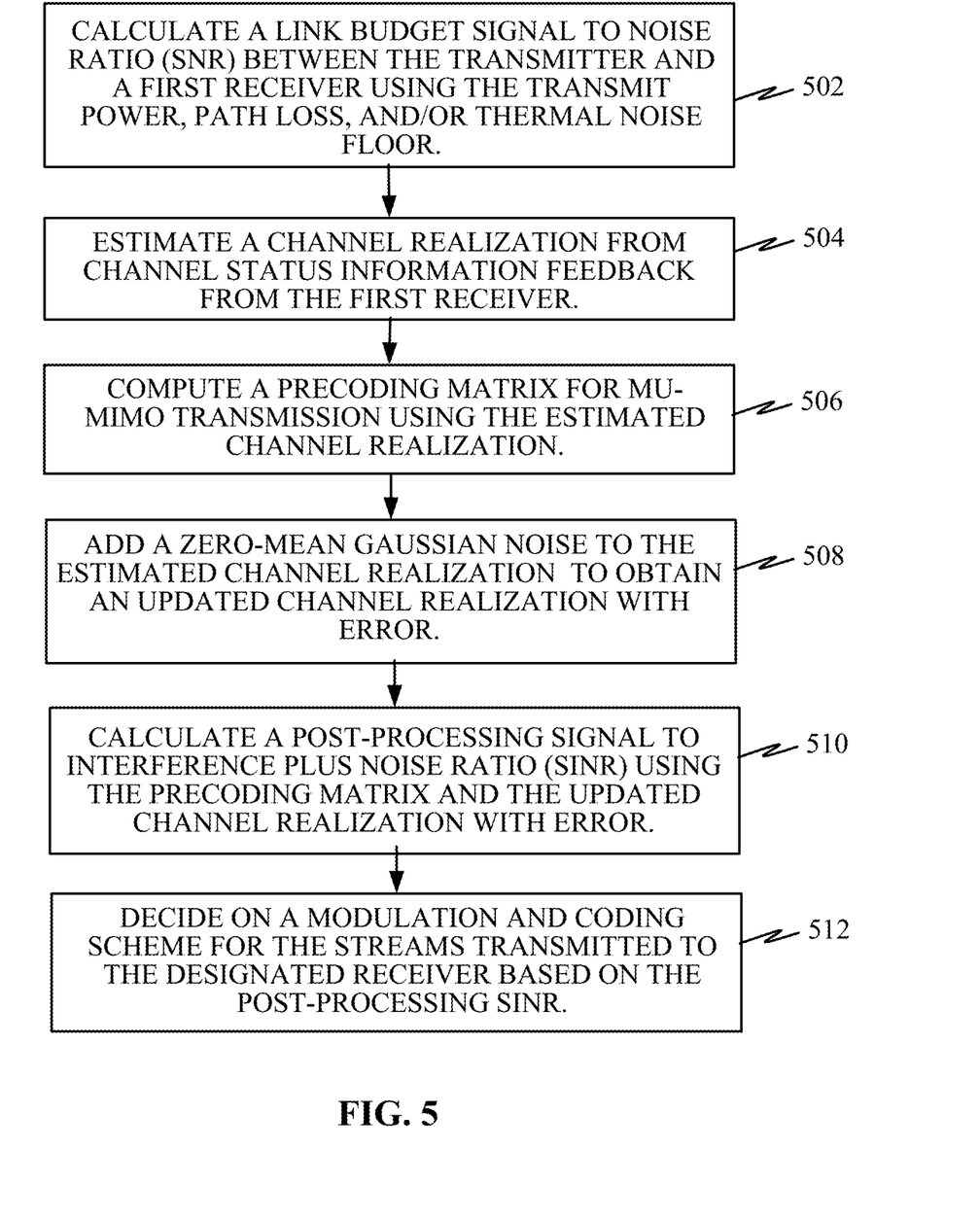
FIG. 5 illustrates a method for updating a modulation and coding scheme (MCS) for a particular channel/stream at a transmitter without prior to updating channel realization.

FIG. 5 illustrates a method for updating a modulation and coding scheme (MCS) for a particular channel/stream at a transmitter prior to updating channel realization. As previously noted, a transmitter may initially obtain an instantaneous channel realization (e.g., measured channel characteristic, such as interference and/or noise floor, at a particular moment) and uses that instantaneous channel realization to select a modulation and coding scheme to be used with the stream to be transmitted over that channel. Since the channel characteristics may vary with time, the initially selected modulation and coding scheme may need to be updated. However, channel measurements to obtain an instantaneous channel realization may be resource intensive or not available frequently enough. So, instead, the transmitter estimates a channel realization (e.g., based on age since the previous instantaneous channel realization) and uses the estimated channel realization to update the modulation and coding scheme used for streams on that channel. This may be done for all channels and/or streams used by the transmitter for MIMO transmissions.

The transmitter scheduler may initially calculate the link budget SNR between the transmitter and a specific receiver ($SNR_L$) using the Tx Power ($P_{TX}$), path loss ($P_{Pathloss}$), and thermal noise floor ($P_{Thermal}$) 502, all in dB. That is, $$SNR_L = P_{TX} - P_{Pathloss} - P_{Thermal}$$

The transmitter estimates the channel realization (e.g., channel characteristic, such as interference and/or noise floor, at a particular moment) from the channel status information (CSI) feedback from the receiver 504. To obtain the channel information, the transmitter sends sounding packets to the receiver, requesting for the CSI feedback. Once the transmitter receives the sounding packet, it estimates the channel realization from the packet preamble and then returns the estimate to the transmitter. Afterwards, the transmitter uses the estimated channel realization to compute the precoding matrix for MU-MIMO transmission 506.

As the channel is time varying, especially when the receivers (e.g., mobile devices) are moving, there is a difference between the instantaneous channel realization and the estimated channel realization as time evolves. In order to model such CSI aging loss, the transmitter adds a zero-mean Gaussian noise w (e.g., variance of added noise may depend on age of the previous channel realization measurement) to the estimated channel realization h to obtain an updated channel realization g with error 508. That is, the updated channel realization g with error is $$g = h + w$$

The noise power, denoted by $\sigma_w^2$, is determined by both the CSI feedback interval and the link budget SNR between the AP and the STA, i.e., $$\sigma_w^2 = 10 \log_{10}(10^{CSI_L/10} + 10^{SNR_L/10})$$

where $CSI_L$ is the CSI aging loss in dB, determined by the CSI feedback interval. For example, in a channel with a coherence time of 800 msec, $CSI_L = -25$ dBc if the CSI feedback interval is 20 msec.

The post-processing SINR can be calculated by using the precoding matrix and the updated channel realization with error 510. For example, if the minimum mean squared error (MMSE) receiver is implemented, then the post-processing SINR of the kth stream is given by $$SNR_k = g^* R_k^{-1} g$$

where $$R_k = \sigma_k^2 + \sum_{n \neq k} g_n^* g_n$$

and $\sigma_k^2$ is the channel noise of the kth stream.

Given the post-processing SINR, the transmitter scheduler decides a MCS for the streams transmitted to the designated receiver 512. For example, the transmitter can search a pre-stored rate table for the optimal MCS for the given post-processing SINR and the targeted bit-error-rate. The selected MCS may also depend on the MIMO processing technique at the receiver, which may use interference cancellation or not. In one example, the scheduler may select a MCS on a per receiver basis, so that transmissions are tailored to each receiver based on the channel conditions (e.g., SINR).

Exemplary Aggregation Enforcement

In the case of IEEE 802.11n, the standard does not specify how to ensure a large number of frames to be encapsulated into an aggregate. In the case of IEEE 802.11ac where MU-MIMO is mandatory, the transmit scheduler cannot fully use the transmission opportunity (TxOP) if there are not enough packets in the transmit buffers of the scheduled flows/streams. By introducing additional delay through a packet accumulation interval $T_A$, a novel method of aggregation enforcement ensures that there are more frames in the transmit buffers of the scheduled stations. In this fashion, the transmit scheduler can encapsulate a larger SDMA packet for a given TxOP.

The duration of the MU-MIMO transmission time is closely related to Media Access Control (MAC) layer efficiency within a protocol stack. The MAC efficiency decreases with increasing data rate in the physical (PHY) layer of the protocol stack due to the fixed overhead in the frame preamble and inter-frame space. In MU-MIMO, additional fixed overhead in the preamble is introduced to support multiple spatial streams for a higher data rate. The fixed overhead accounts for a larger percentage of airtime as the transmission time of data payload becomes shorter with respect to the increasing PHY rate. That is, longer transmission duration of payload results in a smaller percentage of overhead airtime and thus higher MAC efficiency.

The payload transmission time is proportional to the number of packets aggregated in the transmission. According to the IEEE 802.11 Enhanced Distributed Channel Access (EDCA) protocol, a transmitter with packets in its transmit buffer starts transmission after a random backoff interval (counter). The number of packets that the transmitter can send within one transmission is given by the product of the time waiting for medium access and the packet arrival rate. If the backoff interval is small, the transmitter will access the medium very often. The backoff interval may vary (randomly) each transmission period. Such medium access results in short transmission times and low MAC efficiency. In addition, too often medium access leads to more packet collisions between different transmitter devices, which further decreases the MAC efficiency.

Figure 6:
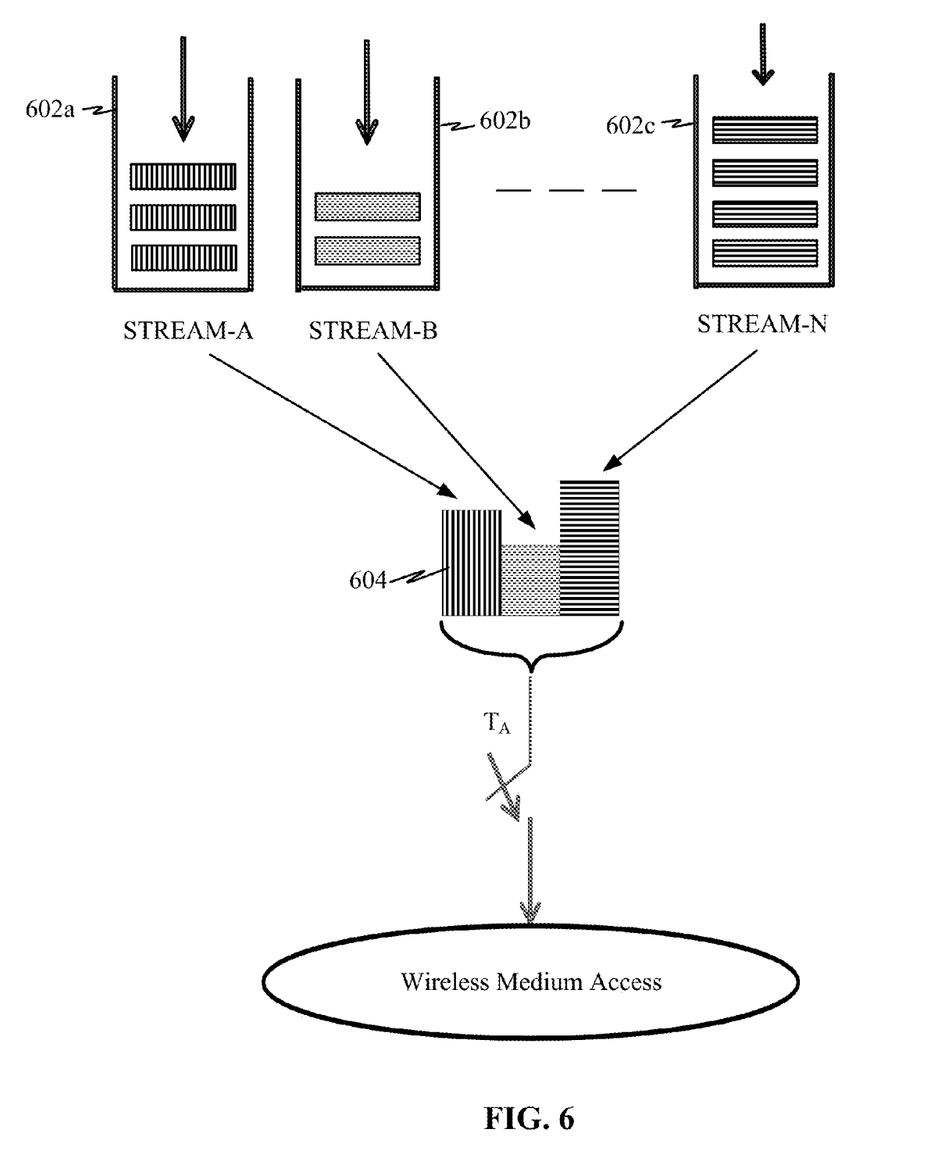
FIG. 6 illustrates a transmit scheduler that defers its channel access if the duration since the last MU-MIMO transmission is less than a packet delay transmission interval.

According to one feature, MAC efficiency is improved by controlling the medium access of MU-MIMO transmissions. The strategy is to increase the airtime of data payload in each MU-MIMO transmission by introducing a transmission interval/timer that delays transmissions until a sufficiently large amount of data has been buffered for transmission. That is, this packet delay transmission interval $T_A$ is superimposed over any other backoff interval (counter) that may typically be used to trigger transmissions. The method disclosed herein specifies a packet delay transmission interval $T_A$ for any two consecutive MU-MIMO transmissions. As depicted in FIG. 6, the scheduler defers its channel access if the duration since the last MU-MIMO transmission is less than a packet delay transmission interval $T_A$. That is, as a plurality of queues 602a-c are filled with packets for different streams to different stations (receivers). Rather than automatically transmitting the packets upon expiration of the random backoff counter (e.g., typically implemented by a transmission standard or protocol), transmissions are delayed by the packet delay transmission interval $T_A$ (transmission timer) which is configured/selected so that a sufficiently long period of time passes between transmissions (e.g., so that a larger number of packets can be accumulated in the queues). This results in a larger transmission frame 604 being transmitted over the wireless medium. Such a method can be implemented in, but not limited to, the following different ways.

Figure 7:
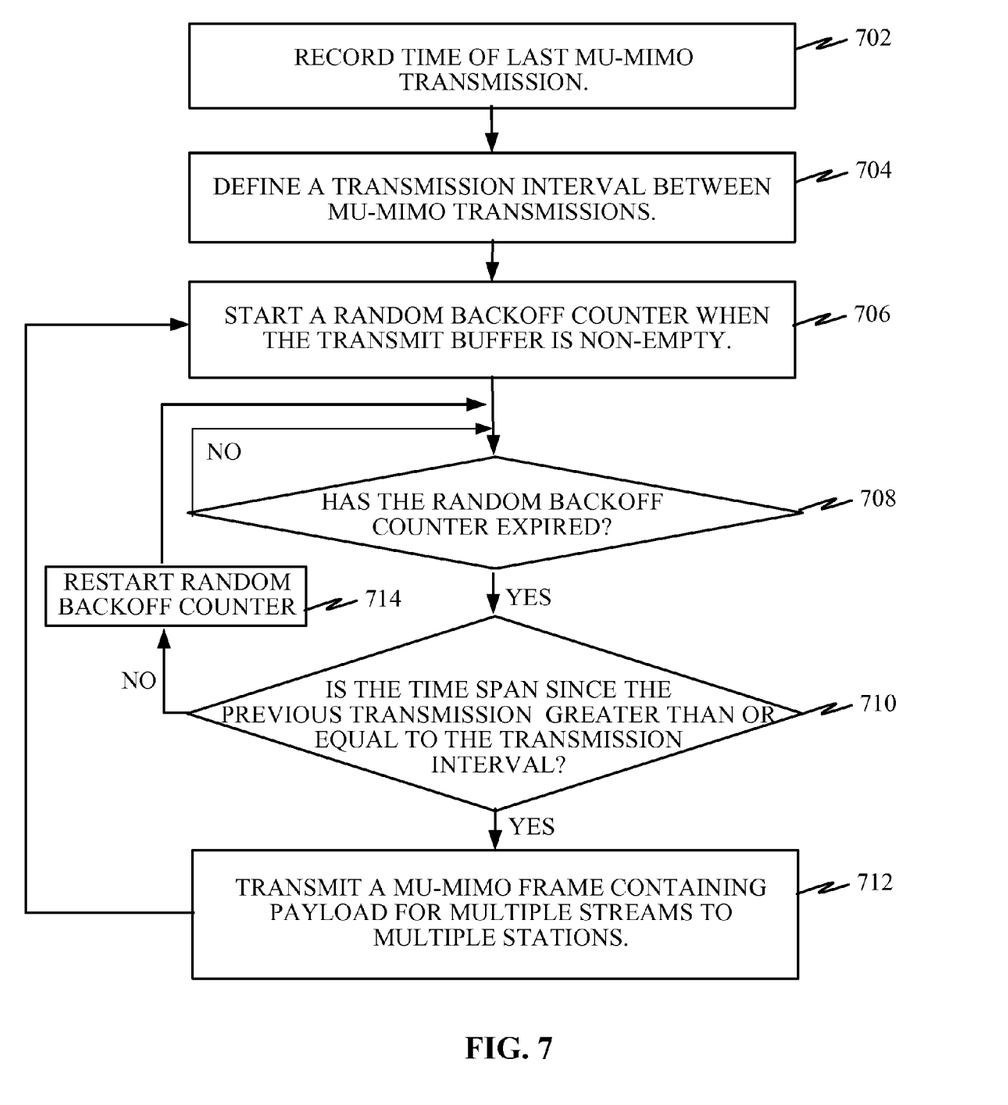
FIG. 7 illustrates a method for delaying MU-MIMO transmissions until the buffered payloads are sufficiently large.

FIG. 7 illustrates a method for delaying MU-MIMO transmissions until the buffered payloads are sufficiently large.

The scheduler records the time when the last MU-MIMO transmission takes place 702.

The scheduler defines a transmission interval $T_A$ between MU-MIMO transmissions 704.

The scheduler starts a random backoff counter whenever the transmit buffer is non-empty as in the conventional way 706.

When the random backoff expires 708, the scheduler checks if the time span since the previous MU-MIMO transmission is greater than or equal to the transmission interval $T_A$ 710. If yes, then the scheduler proceeds with the MU-MIMO transmission (i.e., a MU-MIMO frame containing payload for multiple streams) 712. Otherwise, it gives up this transmission opportunity and restarts its random backoff counter 714.

The transmit scheduler can also add an accumulation buffer to store the incoming packets before the transmit buffer, which is responsible for triggering the random backoff interval/counter. The transmit buffer reads packets from the accumulation buffer every interval $T_A$. During this interval, the accumulation buffer accumulating packets from the upper layer, and remains "closed" to the transmit buffer. After the interval $T_A$ the accumulation buffer becomes "open" and the transmit buffer reads all the packets from the accumulation buffer. In this way, the interval between two consecutive MU-MIMO transmissions is at least $T_A$.

In one implementation, the value of $T_A$ may depend on the access category of traffic. For real-time traffic such as voice and video with a certain latency requirement, $T_A$ may be chosen with some margin to ensure the latency requirement. For best effort or background traffic, $T_A$ can be chosen to achieve the maximum transmission opportunity (TxOP).

In an alternative implementation, the transmission interval $T_A$ is started from the previous MIMO transmission. However, the random backoff interval is only started after the transmission interval $T_A$ has expired.

The aggregation method proposed in this invention is not limited to MU-MIMO 802.11ac systems, and is also applicable to SU-MIMO in 802.11n devices.

Exemplary Transmitter Device

Figure 8:
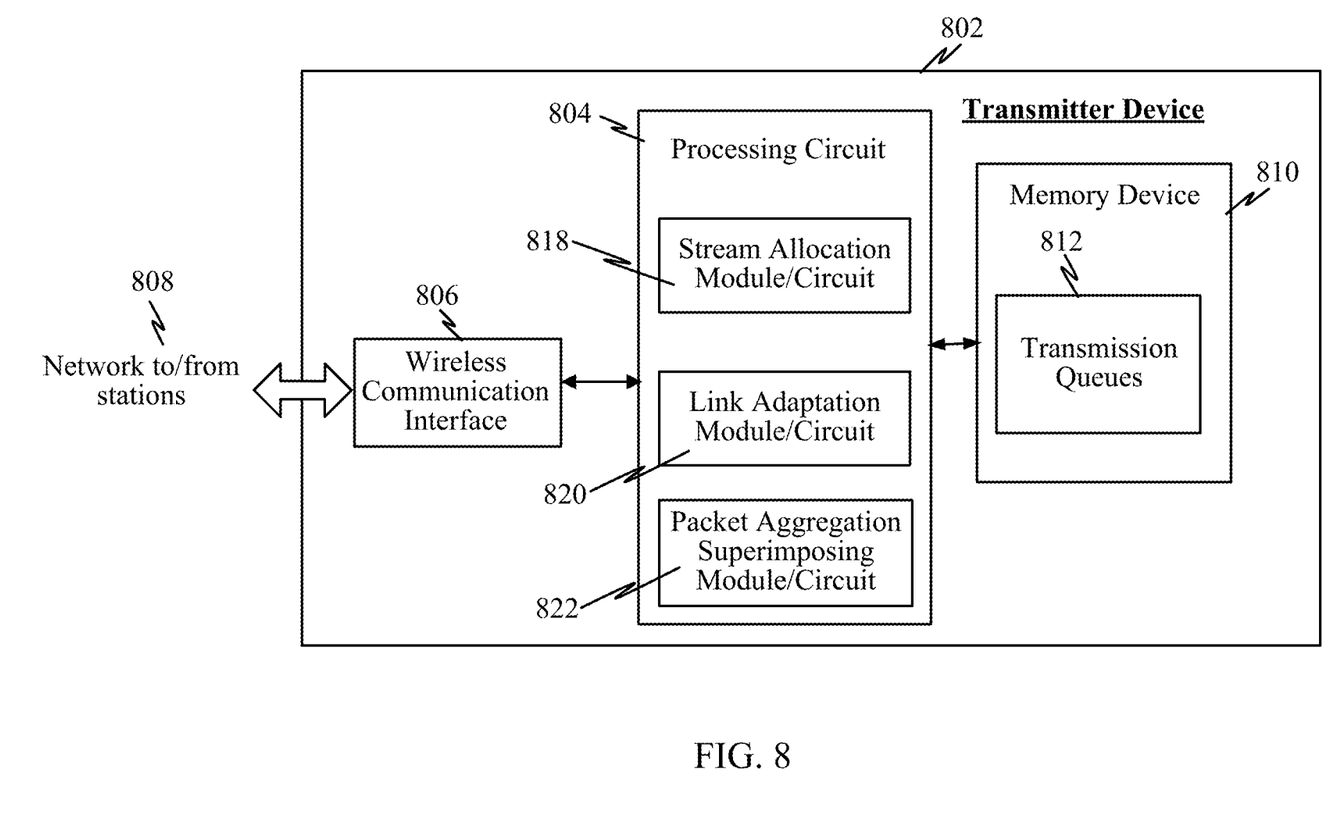
FIG. 8 illustrates an exemplary transmitter device configured to perform one or more operations to improve efficiency of MAC layer MU-MIMO transmissions.

FIG. 8 illustrates an exemplary transmitter device 702 configured to perform one or more operations to improve efficiency of MAC layer MU-MIMO transmissions. The access point 802 may include a processing circuit 804 coupled to a memory device 810, and a wireless communication interface 806. The wireless communication interface 806 may include a transmitter circuit and/or a receiver circuit to facilitate communications over a network with one or more stations (receivers) 808. The memory device 810 may host or implement one or more transmission queues 812 in which outgoing packets (e.g., MAC layer packets for a protocol stack) are queued for transmission. The processing circuit 804 may be adapted or configured to implement a stream allocation module/circuit 818, a link adaptation module/circuit 820, and/or a packet aggregation module/circuit 822. The stream allocation module/circuit 818 may be configured to allocate a number of streams in a MU-MUMO transmission to each of a plurality of served stations according to a corresponding queue length for each station and the number of receive antennas used by each of the served stations. For example, this stream allocation module/circuit 818 may carry out the method illustrated in FIG. 4. The link adaptation module/circuit 820 may be configured to select a modulation and coding scheme for the streams to be transmitted to a particular station based on a post-processing signal to interference and noise ratio for the channel between the access point and the particular station. For example, this link adaptation module/circuit 820 may carry out the method illustrated in FIG. 8. The packet aggregation module/circuit 822 may be configured to: (a) start a transmission timer upon sending the MU-MIMO transmission, (b) start a random backoff counter upon one of either: (a) expiration of the transmission timer or (b) receipt of data at a transmission queue, and/or (c) send a new MU-MIMO transmission upon expiration of the random backoff counter if the transmission timer has expired, otherwise, the random backoff counter is restarted one or more times until the transmission timer has expired. The transmission timer may have a longer time interval than the random backoff counter. For example, this packet aggregation superimposing module/circuit 722 may carry out the method illustrated in FIG. 7.

One or more of the components, steps, features and/or functions illustrated in the FIGs may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGs may be configured to perform one or more of the methods, features, or steps described in the FIGs. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for wirelessly transmitting from a transmitter to one or more receivers within a multi-user (MU) multiple-input and multiple-output (MIMO) communication system, comprising:
dynamically allocating a number of concurrent streams in a MU-MIMO transmission to each of a plurality of served receivers, the dynamic allocation includes
ascertaining a corresponding transmission queue length for each served receiver and
ascertaining a corresponding number of receive antennas used by each served receiver such that the number of concurrent streams is allocated according to the corresponding transmission queue length for each served receiver and the corresponding number of receive antennas used by each served receiver; and
aggregating data for the MU-MIMO transmission by delaying sending the MU-MIMO transmission until expiration of a transmission timer such that data is aggregated in a buffer for the MU-MIMO transmission over a period of time specified by the transmission timer.

2. The method of claim 1, wherein allocating a number of concurrent streams includes:
sorting the served receivers with respect to transmission queue length at an access point;
ascertaining the corresponding number of receive antennas available to each served receiver; and allocating the number of streams to each served receiver according to a corresponding queue length for each served receiver and the corresponding number of receive antennas used by each served receiver.

3. The method of claim 1, further comprising:
updating a modulation and coding scheme for allocated streams to be transmitted to a particular receiver, prior to obtaining a new channel realization measurement, based on an estimated channel realization.

4. The method of claim 3, wherein the estimated channel realization is obtained by:
modeling channel status information for a first channel for aging loss; and
adding a zero-mean Gaussian noise w to a previously obtained estimated channel realization h for the first channel to obtain an updated channel realization used in updating the modulation and coding scheme for a first stream carried by the first channel.

5. The method of claim 4, wherein the modulation and coding scheme is further updated based on a post-processing signal to interference and noise ratio for the first channel between the transmitter and the particular receiver.

6. The method of claim 3, wherein updating a modulation and coding scheme for the allocated streams to be transmitted to a particular receiver includes:
calculating a link budget signal-to-noise ratio (SNR) between the transmitter and a first receiver using at least one of a corresponding transmit power, path loss, or thermal noise floor;
estimating a channel realization from channel status information feedback from the first receiver;
computing a precoding matrix for multi-user (MU) multiple-input multiple-output (MIMO) transmission using the estimated channel realization;
adding a zero-mean Gaussian noise to the estimated channel realization to obtain an updated channel realization with error;
calculating a post-processing signal to interference plus noise ratio (SINR) using the precoding matrix and the updated channel realization with error; and
deciding on a modulation and coding scheme for the allocated streams transmitted to the first receiver based on the post-processing signal to interference and noise ratio (SINR).

7. The method of claim 3, wherein the modulation and coding scheme for the allocated streams is updated on a per receiver basis.

8. The method of claim 3, wherein allocated streams to different receivers have different modulation and coding schemes.

9. The method of claim 1, further comprising:
starting the transmission timer upon sending the MU-MIMO transmission;
starting a random backoff counter upon receipt of data at a transmission queue; and
sending the MU-MIMO transmission upon expiration of the random backoff counter and expiration of the transmission timer, wherein the random backoff counter is restarted one or more times until the transmission timer has expired.

10. The method of claim 9, wherein the random backoff counter is defined by an IEEE 802.11 Multi-User MIMO wireless communication standard.

11. A transmitter device configured for wirelessly transmitting to a station within a multi-user (MU) multiple-input and multiple-output (MIMO) communication system, comprising:

a wireless communication interface for communicating over a wireless network with a plurality of stations; and
a processing circuit coupled to the wireless communication interface, the processing circuit is configured to:
dynamically allocating a number of concurrent streams in a MU-MIMO transmission to each of a plurality of served receivers, the dynamic allocation includes
ascertaining a corresponding transmission queue length for each served receiver and
ascertaining a corresponding number of receive antennas used by each served receiver such that the number of concurrent streams is allocated according to the corresponding transmission queue length for each served receiver and the corresponding number of receive antennas used by each served receiver; and
aggregate data for the MU-MIMO transmission by delaying sending the MU-MIMO transmission until expiration of a transmission timer such that data is aggregated in a buffer for the MU-MIMO transmission over a period of time specified by the transmission timer.

12. The transmitter device of claim 11, wherein each MU-MIMO transmission includes a MU-MIMO frame containing a plurality of streams to different stations, wherein the MU-MIMO frame has an expanded duration relative to typical frames defined for MU-MIMO transmissions.

13. The transmitter device of claim 11, wherein the processing circuit is further configured to allocate the number of concurrent streams by:
sorting the served receivers with respect to transmission queue length at an access point;
ascertaining the number of receive antennas available to each served receiver; and
allocating the number of streams to each receiver according to a corresponding queue length for each served receiver and the number of receive antennas used by each served receiver.

14. The transmitter device of claim 11, further comprising:
updating a modulation and coding scheme for allocated streams to be transmitted to a particular receiver, prior to obtaining a new channel realization measurement, based on an estimated channel realization.

15. The transmitter device of claim 14, wherein the processing circuit is further configured to obtain the estimated channel realization by
modeling channel status information for a first channel for aging loss; and
adding a zero-mean Gaussian noise w to a previously obtained estimated channel realization h for the first channel to obtain an updated channel realization used in updating the modulation and coding scheme for a first stream carried by the first channel.

16. The transmitter device of claim 15, wherein the modulation and coding scheme is further updated based on a post-processing signal to interference and noise ratio for the first channel between the transmitter and the particular receiver.

17. The transmitter device of claim 14, wherein the processing circuit is further configured to update the modulation and coding scheme for the allocated streams to be transmitted to a particular receiver by:
calculating a link budget signal-to-noise ratio (SNR) between the transmitter and a first receiver using at least one or a corresponding transmit power, path loss, or thermal noise floor;
estimating a channel realization from channel status information feedback from the first receiver;

computing a precoding matrix for multi-user (MU) multiple-input multiple-output (MIMO) transmission using the estimated channel realization;

adding a zero-mean Gaussian noise to the estimated channel realization to obtain an updated channel realization with error;

calculating a post-processing signal to interference plus noise ratio (SINR) using the precoding matrix and the updated channel realization with error; and deciding on a modulation and coding scheme for the allocated streams transmitted to the first receiver based on the post-processing signal to interference and noise ratio (SINR).

18. The transmitter device of claim 14, wherein the modulation and coding scheme for the allocated streams is updated on a per receiver basis.

19. The transmitter device of claim 14, wherein allocated streams to different served receivers have different modulation and coding schemes.

20. The transmitter device of claim 11, wherein the processing circuit is further configured to:

start the transmission timer upon sending the MU-MIMO transmission;

start a random backoff counter upon receipt of data at a transmission queue; and send the MU-MIMO transmission upon expiration of the random backoff counter and expiration of the transmission timer, wherein the random backoff counter is restarted one or more times until the transmission timer has expired.

21. The transmitter device of claim 20, wherein the random backoff counter is defined by an IEEE 802.11 Multi-User MIMO wireless communication standard.

22. A transmitter device, comprising:

means for dynamically allocating a number of concurrent streams in a MU-MIMO transmission to each of a plurality of served receivers, the dynamic allocation including ascertaining a corresponding transmission queue length for each served receiver and ascertaining a corresponding number of receive antennas used by each served receiver such that the number of concurrent streams is allocated according to the corresponding transmission queue length for each served receiver and the corresponding number of receive antennas used by each served receiver; and means for aggregating data for the MU-MIMO transmission by delaying sending the MU-MIMO transmission until expiration of a transmission timer such that data is aggregated in a buffer for the MU-MIMO transmission over a period of time specified by the transmission timer.

23. The transmitter device of claim 22, wherein allocating a number of allocated streams includes:

sorting the served receivers with respect to transmission queue length at an access point;

ascertaining the corresponding number of receive antennas available to each served receiver; and allocating the number of streams to each served receiver according to a corresponding queue length for each served receiver and the corresponding number of receive antennas used by each served receiver.

24. The transmitter device of claim 22, further comprising:

means for updating a modulation and coding scheme for the allocated streams to be transmitted to a particular served receiver, prior to obtaining a new channel realization measurement, based on an estimated channel realization.

25. The transmitter device of claim 24, wherein the estimated channel realization is obtained by modeling channel status information for a first channel for aging loss; and adding a zero-mean Gaussian noise w to a previously obtained estimated channel realization h for the first channel to obtain an updated channel realization used in updating the modulation and coding scheme for a first stream carried by the first channel.

26. The transmitter device of claim 24, wherein the modulation and coding scheme is further updated based on a post-processing signal to interference and noise ratio for the first channel between the transmitter and the particular receiver.

27. The transmitter device of claim 24, wherein the means for updating a modulation and coding scheme for the allocated streams to be transmitted to a particular receiver includes:

means for calculating a link budget signal-to-noise ratio (SNR) between the transmitter and a first receiver using at least one of a corresponding transmit power, path loss, or thermal noise floor;

means for estimating a channel realization from channel status information feedback from the first receiver;

means for computing a precoding matrix for multi-user (MU) multiple-input multiple-output (MIMO) transmission using the estimated channel realization;

means for adding a zero-mean Gaussian noise to the estimated channel realization to obtain an updated channel realization with error;

means for calculating a post-processing signal to interference plus noise ratio (SINR) using the precoding matrix and the updated channel realization with error; and means for deciding on a modulation and coding scheme for the allocated streams transmitted to the first receiver based on the post-processing signal to interference and noise ratio (SINR).

28. A non-transitory processor-readable medium having one or more instructions operational in an access point, which when executed by one or more processors causes the processors to:

dynamically allocating a number of concurrent streams in a MU-MIMO transmission to each of a plurality of served receivers, the dynamic allocation including ascertaining a corresponding transmission queue length for each served receiver and ascertaining a corresponding number of receive antennas used by each served receiver such that the number of concurrent streams is allocated according to the corresponding transmission queue length for each served receiver and the corresponding number of receive antennas used by each served receiver; and aggregate data for the MU-MIMO transmission by delaying sending the MU-MIMO transmission until expiration of a transmission timer such that data is aggregated in a buffer for the MU-MIMO transmission over a period of time specified by the transmission timer.

29. The processor-readable medium of claim 28, wherein allocating a number of streams includes:

sorting the served receivers with respect to transmission queue length at the access point;

ascertaining the corresponding number of receive antennas available to each served receiver; and allocating the number of streams to each served receiver according to a corresponding queue length for each receiver and the corresponding number of receive antennas used by each served receiver.

30. The processor-readable medium of claim 28, further comprising one or more instructions which when executed by the one or more processors causes the processors to:
- update a modulation and coding scheme for the allocated streams to be transmitted to a particular receiver, prior to obtaining a new channel realization measurement, based on an estimated channel realization.

31. The processor-readable medium of claim 30, wherein the estimated channel realization is obtained by
- modeling channel status information for a first channel for aging loss; and
- adding a zero-mean Gaussian noise w to a previously obtained estimated channel realization h for the first channel to obtain an updated channel realization used in updating the modulation and coding scheme for a first stream carried by the first channel.

32. The processor-readable medium of claim 31, wherein the modulation and coding scheme is further updated based on a post-processing signal to interference and noise ratio for the first channel between the transmitter and the particular receiver.

* * * * *